(12) United States Patent
Miao et al.

(10) Patent No.: US 12,181,584 B2
(45) Date of Patent: Dec. 31, 2024

(54) SYSTEMS AND METHODS FOR MONITORING LIDAR SENSOR HEALTH

(71) Applicant: Argo AI, LLC, Pittsburgh, PA (US)

(72) Inventors: Hsin Miao, Sunnyvale, CA (US); Willibald Brems, Bavaria (DE); Dikpal Reddy, Palo Alto, CA (US)

(73) Assignee: VOLKSWAGEN GROUP OF AMERICA INVESTMENTS, LLC, Reston, VA (US)

( * ) Notice: Subject to any disclaimer, the term of this patent is extended or adjusted under 35 U.S.C. 154(b) by 1024 days.

(21) Appl. No.: 17/148,691

(22) Filed: Jan. 14, 2021

(65) Prior Publication Data
US 2022/0221585 A1 Jul. 14, 2022

(51) Int. Cl.
*G01S 17/931* (2020.01)
*G01S 7/48* (2006.01)
*G01S 7/487* (2006.01)

(52) U.S. Cl.
CPC .......... *G01S 17/931* (2020.01); *G01S 7/4808* (2013.01); *G01S 7/4873* (2013.01)

(58) Field of Classification Search
None
See application file for complete search history.

(56) References Cited

U.S. PATENT DOCUMENTS

| 10,474,161 | B2 * | 11/2019 | Huang | G06V 20/56 |
| 11,158,120 | B1 | 10/2021 | Jespersen et al. | |
| 2014/0368807 | A1 * | 12/2014 | Rogan | G01S 17/89 |
| | | | | 356/28 |
| 2015/0109290 | A1 * | 4/2015 | Chang | G06T 17/20 |
| | | | | 345/420 |
| 2015/0146971 | A1 * | 5/2015 | Robert | G06T 7/557 |
| | | | | 382/154 |
| 2016/0154999 | A1 * | 6/2016 | Fan | G06T 7/155 |
| | | | | 382/103 |

(Continued)

FOREIGN PATENT DOCUMENTS

| CN | 107767375 A | * | 3/2018 | ............. G01S 17/02 |
| EP | 3707469 A1 | | 9/2020 | |

(Continued)

OTHER PUBLICATIONS

De-Noising of Lidar Point Clouds Corrupted by Snowfall (Year: 2018).*

(Continued)

*Primary Examiner* — Yuqing Xiao
*Assistant Examiner* — Jempson Noel
(74) *Attorney, Agent, or Firm* — Fox Rothschild LLP

(57) ABSTRACT

Systems and methods for generating operating an autonomous vehicle. The methods comprise: obtaining LiDAR point cloud data generated by a LiDAR system of the autonomous vehicle; inspecting the LiDAR point cloud data to infer a health of LiDAR beams; identifying bad quality point cloud data based on the inferred health of the LiDAR beams; removing the bad quality point cloud data from the LiDAR point cloud data to generate modified LiDAR point cloud data; and causing the autonomous vehicle to perform at least one autonomous driving operation or mode change based on the modified LiDAR point cloud data.

16 Claims, 13 Drawing Sheets

(56) References Cited

U.S. PATENT DOCUMENTS

2020/0339151 A1  10/2020  Batts et al.
2021/0183016 A1* 6/2021  Toyoura ................ G01S 7/4808

FOREIGN PATENT DOCUMENTS

WO      2019044571 A1    3/2019
WO      WO-2019182782 A1 * 9/2019 ............. G06T 15/80

OTHER PUBLICATIONS

Deep Learning for LiDAR Point Clouds in Autonomous Driving: A Review (Year: 2020).*
CN 107767375 A English (Year: 2018).*
Algorithm for beam deformation modeling from LiDAR data search results, https://www.researchgate.net/publication/282902880_Algorithm_for_beam_deformation . . . Oct. 22, 2020.

* cited by examiner

SYSTEMS AND METHODS FOR MONITORING LIDAR SENSOR HEALTH

BACKGROUND

Statement of the Technical Field

The present disclosure relates generally to computing devices. More particularly, the present disclosure relates to implementing systems and methods for monitoring LiDAR sensor health.

Description of the Related Art

Modern day vehicles have at least one on-board computer and have internet/satellite connectivity. The software running on these on-board computers monitor and/or control operations of the vehicles. The on-board computers perform motion planning operations to determine a trajectory which the vehicle is to follow. The vehicle trajectory may be generated using sensor data such as LiDAR point clouds. The LiDAR point clouds are used to track objects (e.g., pedestrians and other vehicles).

SUMMARY

The present disclosure concerns implementing systems and methods for operating an autonomous vehicle. The methods comprise performing the following operations by a computing device: obtaining LiDAR point cloud data generated by a LiDAR system of the autonomous vehicle; inspecting the LiDAR point cloud data to infer a health of LiDAR beams; identifying bad quality point cloud data based on the inferred health of the LiDAR beams; removing the bad quality point cloud data from the LiDAR point cloud data to generate modified LiDAR point cloud data; and causing the autonomous vehicle to perform at least one autonomous driving operation or mode change based on the modified LiDAR point cloud data.

The health of the LiDAR beam is inferred by: computing a plurality of metrics based on characteristics of a LiDAR point cloud defined by the LiDAR point cloud data; computing a confidence score based on the plurality of metrics; and classifying the LiDAR beam as a faulty beam or a good beam based on the confidence score. For example, the LiDAR beam is classified as a faulty beam when the confidence score is less than a threshold value. The metrics can include, but are not limited to, an outlier metric, a shape context metric, and/or a height metric.

In some scenarios, the metrics are determined based on at least one of a total number of data points in the LiDAR point cloud, intensity values of the LiDAR point cloud, and z-coordinate values for data points in the LiDAR point cloud. For example, a given metric is equal to a total number of data points in the LiDAR point cloud. Another given metric is generated by: determining a plurality of numbers, each said number comprising a total number of data points for a given intensity value of the LiDAR point cloud; and converting the plurality of numbers into a single number. Yet another metric is generated by: using a z-coordinate value to compute a distance from each given data point to an average z-coordinate value; determining a standard deviation of the z-coordinate values for data points in a LiDAR point cloud; dividing each distance by the standard deviation to obtain a value; and computing an average of the values.

The implementing systems comprise: a processor; and a non-transitory computer-readable storage medium comprising programming instructions that are configured to cause the processor to implement the above described methods.

BRIEF DESCRIPTION OF THE DRAWINGS

The present solution will be described with reference to the following drawing figures, in which like numerals represent like items throughout the figures.

DETAILED DESCRIPTION

Figure 1:
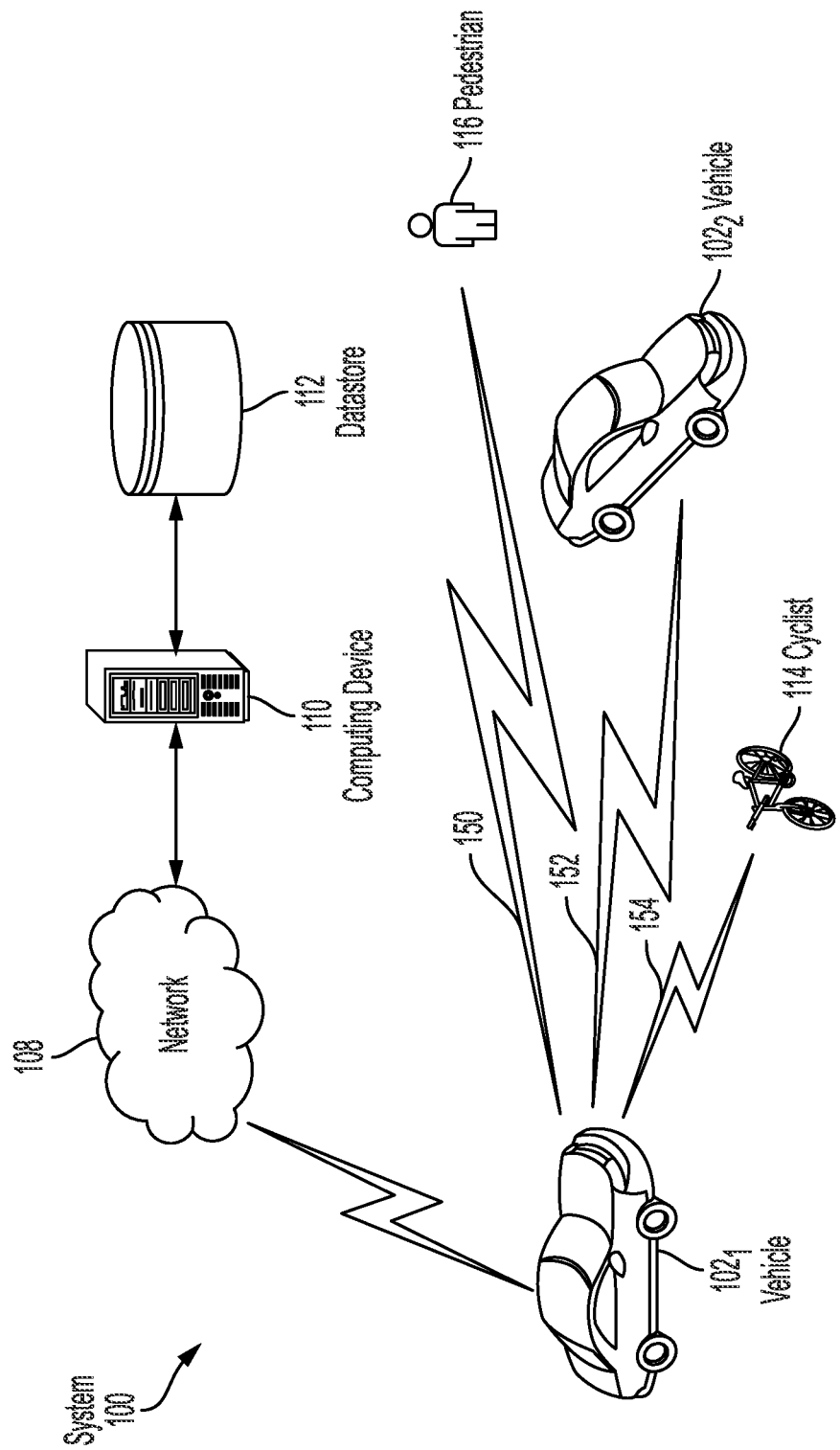
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Modern day vehicles have at least one on-board computer and have internet/satellite connectivity. The software running on these on-board computers monitor and/or control operations of the vehicles. The on-board computers perform motion planning operations to determine a trajectory which the vehicle is to follow. The vehicle trajectory may be generated using sensor data such as LiDAR point clouds. The LiDAR point clouds are used to track objects (e.g., pedestrians and other vehicles).

The LiDAR point clouds may also be employed to generate high-definition maps for use in controlling operations of the autonomous vehicle. The maps provide knowledge of where the autonomous vehicles and/or detected object are relative to each other, roadways, lanes, intersections, crosswalks, parking areas, obstructions, etc. However, the quality of the LiDAR point clouds degrades over time, which impacts the quality of autonomous vehicle perception results and map generation. The present solution addresses this LiDAR point cloud degradation issue in the context of map generation and the context of vehicle perception results.

Figure 13:
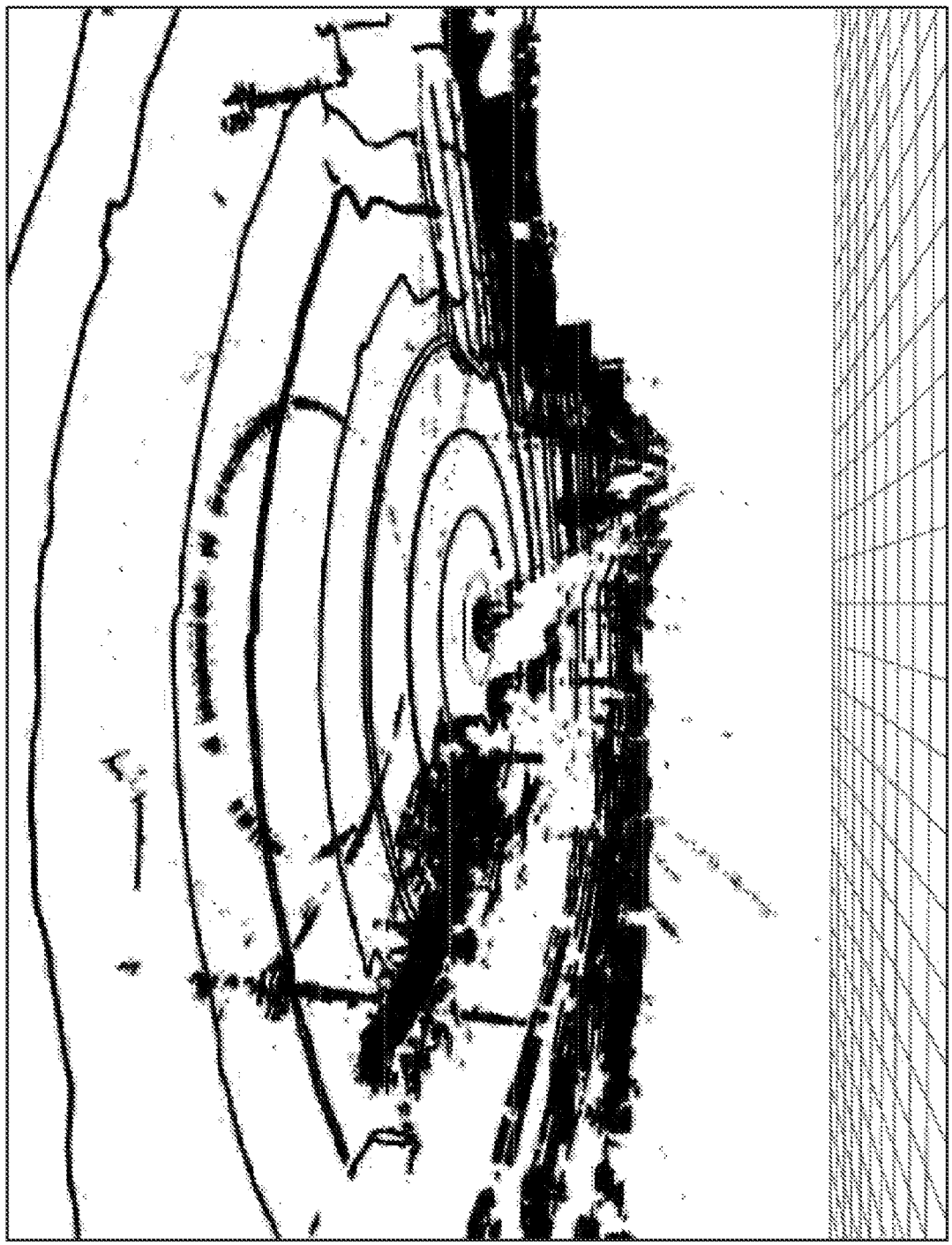
FIG. 13 shows multiple aggregated LiDAR sweeps from a stationary vehicle.

For example, FIG. 13 shows multiple aggregated LiDAR sweeps from a stationary vehicle. A faulty beam in this scenario created a halo of points about the vehicle in midair. The beam was not permanently faulty, and thus provided meaningful LiDAR data for one scan and invalid data for another scan. The faulty beam also produced reasonable measurements for a portion of each scan. The invalid data created by the faulty beam led to corrupted maps. The present solution provides a novel approach to solving this issue of map corruption due to faulty beams.

The novel approach generally involves detecting the faulty beams of a LiDAR system by monitoring beam intensity values and beam point count. From a simple monitoring algorithm for each beam, a confidence number is derived that can be used to, for example, remove potentially faulty beams from sweeps during the map generation process. In order to detect a faulty beam, a histogram of the intensity values may be computed for each beam of the LiDAR system and the number of LiDAR data points for each beam is determined. It has been observed that the majority of LiDAR data points has a zero intensity for faulty beams. It has also been observed that the number of LiDAR data points per beam is lower for faulty beams in comparison to neighbor health beams. Based on the intensity histogram and the point count for each beam, a confidence score may be calculated and tracked across consecutive LiDAR point clouds. A LiDAR beam is considered a failure beam if it is classified as a faulty beam for more than a given percentage of LiDAR sweeps. A data point may be removed from a LiDAR point cloud if it is associated with a failure beam. Occasionally, a LiDAR point cloud has outliers and artifacts due to environmental effects such as solar interference even when the LiDAR beams are functioning as expected. As such, a data point may also be removed from a LiDAR point cloud if it is an outlier point. An outlier point can be detected using Chauvanet's criterion on z-coordinate values for the data points.

A failure beam may be characterized as a messy LiDAR point cloud, a halo above the vehicle, or a dead beam. A messy LiDAR point cloud includes data points for beams exhibiting a false large range. The beams at extreme elevations standout since their data points reside well below ground or high above the sky. Although these data points are only a small percentage of the data points associated with the respective beam, they standout significantly in a final map since they are accumulated over a large time instance. Further, these data points are not consistently off at the same azimuth and vary temporally.

A halo is characterized by data points for a LiDAR beam with a positive elevation angle in the vehicle's frame exhibiting a constant range at some azimuths. This results in a ghost halo over the vehicle even when there are no objects and results in spurious points in the accumulated LiDAR point cloud used for map generation. The data points forming the halo are not at a fixed azimuth at the respective elevation angles.

A dead beam is characterized by a LiDAR point cloud absent of data points and/or comprising data points with nonsense values at all azimuths at all times. Typically, such beams occur in isolation on a given LiDAR system and do not introduce artifacts in accumulated LiDAR point clouds. However, if enough beams fail, then they can affect the density of the data points at the respective elevation angles.

Accordingly, the present solution provides implementing systems and methods for inferring the health of LiDAR sensors by inspecting the LiDAR point clouds. The present solution can be implemented on the autonomous vehicle to monitor LiDAR sensor health in real time while driving and/or implemented in a computing device that is remote from the autonomous vehicle and in a map building pipeline. When the present solution is integrated on the autonomous vehicle, the on-board computing device may perform the following operations: receives LiDAR datasets; analyzes the LiDAR datasets to generate diagnostic signals indicating whether the LiDAR beams are classified as faulty beams; and generate modified LiDAR point cloud data by selectively removing LiDAR data from the LiDAR datasets based on the diagnostic signals (i.e., an inferred health of the LiDAR beams).

In some scenarios, the on-board computing device may use the modified LiDAR point cloud data is used to generate and output a report concerning LiDAR health issues. The on-board computing device may alternatively or additionally cause the AV to switch from an autonomous driving operational mode to an at least partially manual driving operational mode (i.e., a mode in which user input is required). The mode change can be performed when a given number of LiDAR beams are deemed faulty beams.

In other scenarios, the on-board computing device may further generate a map using the modified LiDAR point cloud data. The map may then be used to control autonomous driving operations of the autonomous vehicle. The autonomous driving operations can include, but are not limited to, object tracking operations, object trajectory prediction operations, vehicle trajectory determination operations, and/or collision avoidance operations. For example, the map is used to facilitate generation of a predicted object trajectory, a predicted future intention of the object, and/or a vehicle trajectory. The vehicle may then be controlled to follow the vehicle trajectory if there is an acceptable level of risk for collision with the object or perform a cautious or emergency maneuver if there is an unacceptable level of risk for collision with the object. The present solution is not limited to the particulars of this example.

The present solution has many advantages. For example, no other approach is known to monitor the health of LiDAR beams by inspecting LiDAR point clouds. The implementing systems are designed in a flexible way such that it can be installed on a vehicle to monitor LiDAR beam health in real-time or near real-time and to improve map generation.

The map can be generated, for example, by: obtaining modified LiDAR point clouds including LiDAR data that was generated by a LiDAR system from multiple vantage points or locations; aligning the modified LiDAR point clouds using, for example, Simultaneous Localization and Mapping (SLAM); and combining the aligned LiDAR point clouds to form a combined 3D point cloud.

Ray tracing operations may be performed to test whether any object of the LiDAR data was at any time see-through. Data points are removed from the combined 3D point cloud that are associated with the see-through object(s) to generate a pruned 3D point cloud. The pruned 3D point cloud may still comprise data points associated with moving objects. Thus, additional semantic label based operations may also be employed to remove any remaining data points from the pruned 3D point cloud that are associated with moving objects. The semantic label based operations are performed to generally (i) create a semantic surface image and (ii) remove data points above surfaces of the roads and sidewalks. A final 3D point cloud is generated by removing the data points from the pruned 3D point cloud that are above the roads and sidewalks. The final 3D point cloud can be used in various applications. These applications include, but are not limited to, AV applications, semi-autonomous vehicle applications, and/or robotic applications.

The present solution is described herein in the context of an Autonomous Vehicle (AV). The present solution is not limited to AV applications. The present solution can be used in other applications where high definition road/terrain maps are needed to control operations of a device (e.g., a robot).
Illustrative Implementing Systems Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an AV. The AV $102_1$ can include, but is not limited to, a land vehicle (as shown in FIG. 1), an aircraft, or a watercraft.

AV $102_1$ is generally configured to detect objects $102_2$, 114, 116 in proximity thereto. The objects can include, but are not limited to, a vehicle $102_2$, a cyclist 114 (such as a rider of a bicycle, electric scooter, motorcycle, or the like) and/or a pedestrian 116. The object detection is achieved in accordance with any known or to be known object detection process. The object detection process can be performed at the AV $102_1$, at the remote computing device 110, or partially at both the AV $102_1$ and the remote computing device 110. Accordingly, information related to object detection may be communicated between the AV and a remote computing device 110 via a network 108 (e.g., the Internet, a cellular network and/or a radio network). The object detection related information may also be stored in a database 112.

The object detection can be made, for example, by analyzing sensor data generated by at least one sensor device on the AV $102_1$ and/or information received from a communication device (e.g., a transceiver, a beacon and/or a smart phone) of the object via communication link(s) 150, 152, 154. The communication link(s) 150, 152, 154 can include, but are not limited to, V2X communication links. The term "V2X" refers to a communication between a vehicle an any entity that may affect, or may be affected by, the vehicle. The information can include, but is not limited to, information specifying actions or operations have been performed, being performed and/or are to be performed by the object.

When such an object detection is made, AV $102_1$ performs operations to: generate one or more possible object trajectories for the detected object; and analyze at least one of the generated possible object trajectories to determine whether or not there is an undesirable level of risk that a collision will occur between the AV and object if the AV is to follow a given trajectory. The given vehicle trajectory is generated by the AV $102_1$ using a high-definition map produced in accordance with the present solution. The high-definition map is produced using 3D laser scan data with certain points removed from registered point clouds. The removed points can include points that are associated with faulty beams, and/or points associated with dynamic objects. The manner in which the high-definition map is produced will become more evident as the discussion progresses.

If there is not an undesirable level of risk that a collision will occur between the AV and object if the AV is to follow a given trajectory, then the AV $102_1$ is caused to follow the given vehicle trajectory. If is an undesirable level of risk that a collision will occur between the AV and object if the AV is to follow a given trajectory, then the AV $102_1$ is caused to (i) follow another vehicle trajectory with a relatively low risk of collision with the object or (ii) perform a maneuver to reduce the risk of collision with the object or avoid collision with the object (e.g., brakes and/or changes direction of travel).

Figure 2:
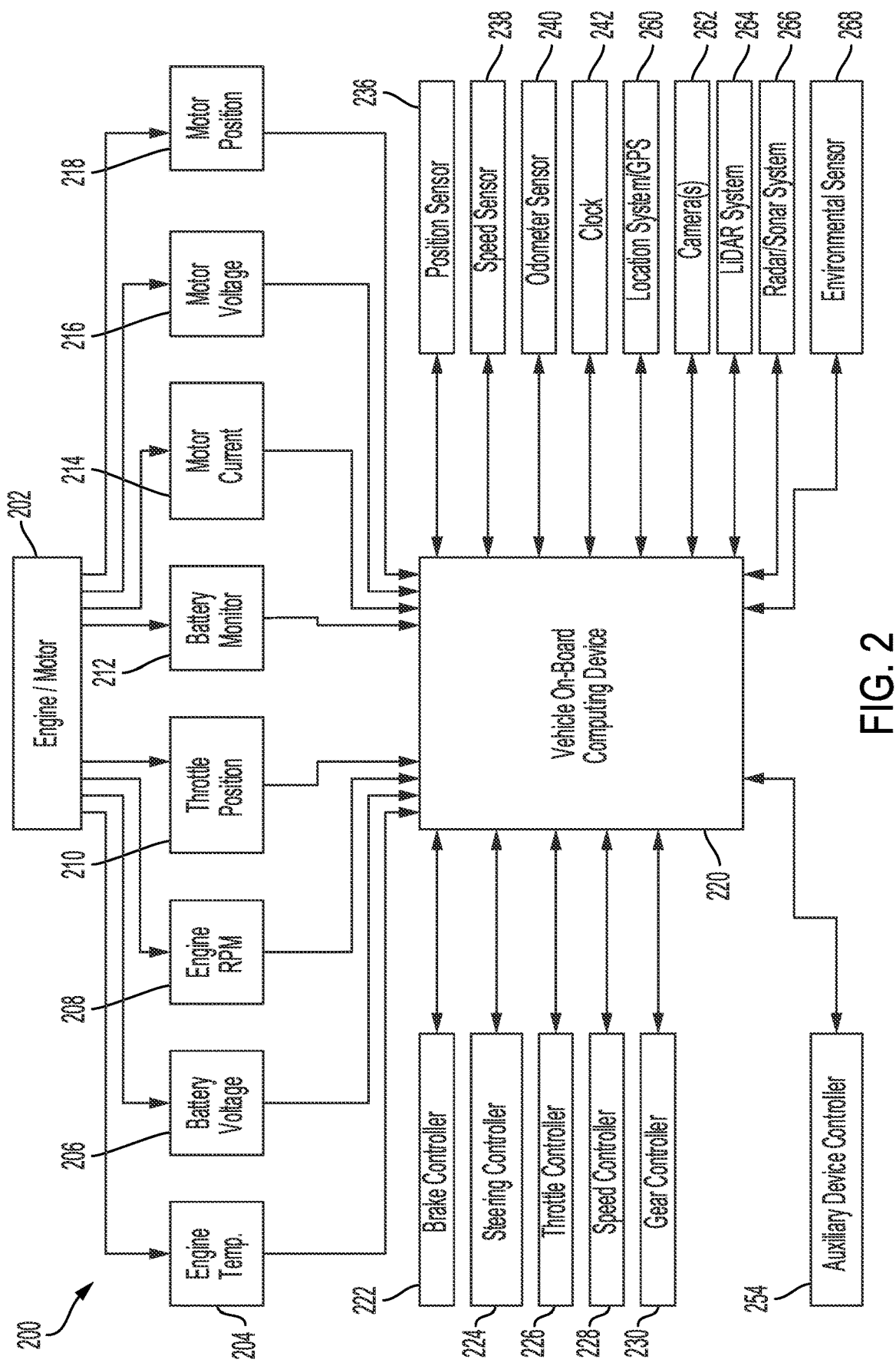
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example, a position sensor 236 such as an accelerometer, gyroscope and/or inertial measurement unit, a speed sensor 238, and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example, a location sensor 260 (e.g., a Global Positioning System (GPS) device), object detection sensors (e.g., camera(s) 262), a LiDAR system 264, and/or a radar/sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors (e.g., LiDAR system 264) is communicated to the on-board computing device 220. The object detection information and/or captured images are processed by the on-board computing device 220 to detect objects in proximity to the vehicle 200. The object detections are made in accordance with any known or to be known object detection technique.

When the on-board computing device 220 detects a moving object, the on-board computing device 220 will generate one or more possible object trajectories for the detected object, and analyze the possible object trajectories to assess the risk of a collision between the object and the AV if the AV was to follow a given vehicle trajectory. If there is not a risk of collision, then the AV is caused to follow the given vehicle trajectory. If there is a risk of collision, then an alternative vehicle trajectory can be generated and/or the AV can be caused to perform a certain maneuver (e.g., brake, accelerate and/or change direction of travel). The vehicle trajectories are generated using a high definition map which is created in accordance with the present solution. The manner in which the high definition map is created will become evident as the discussion progresses.

Figure 3:
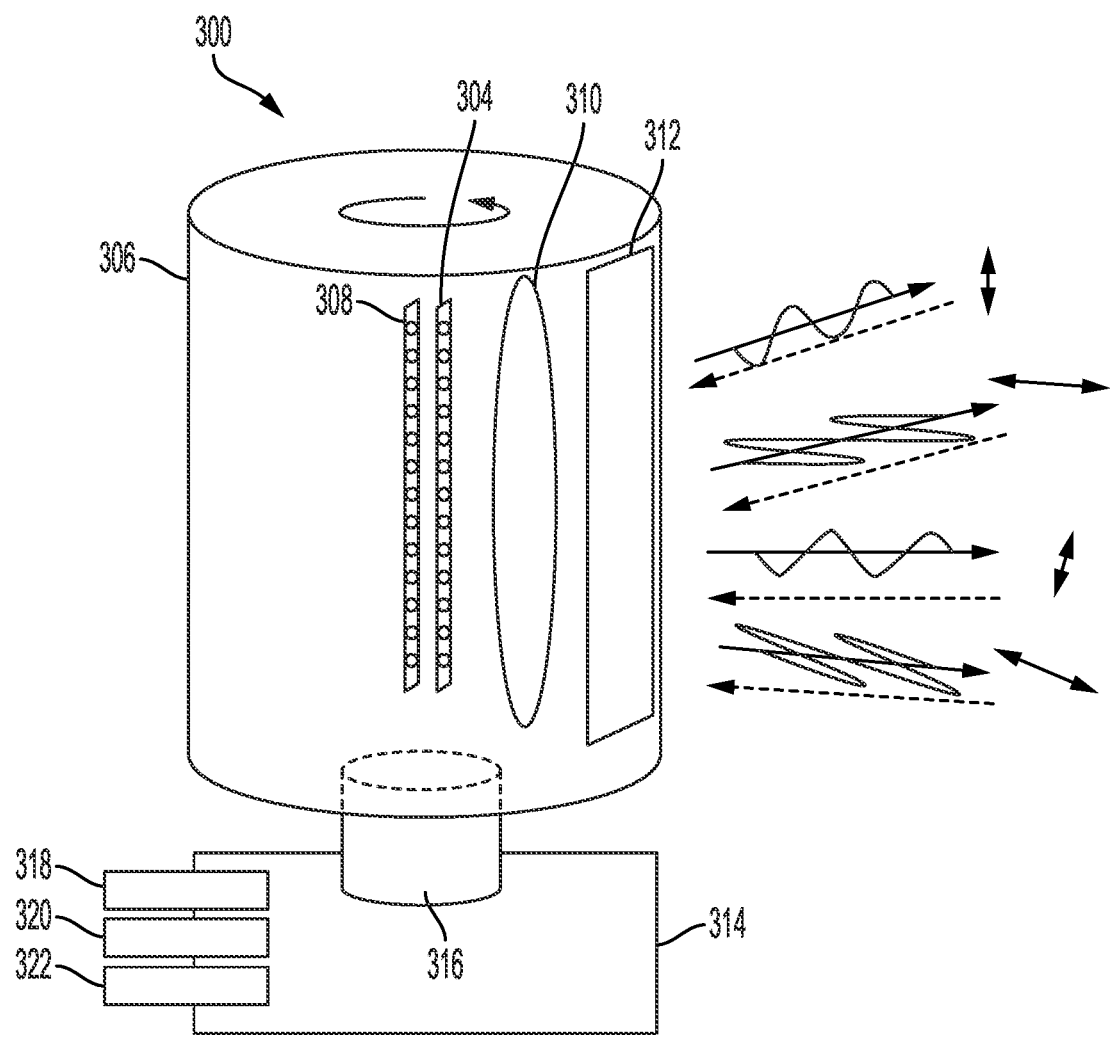
FIG. 3 is an illustration of an illustrative architecture for a LiDAR system employed by the vehicle shown in FIG. 2.

Referring now to FIG. 3, there is provided an illustration of an illustrative LiDAR system 300. LiDAR system 264 of FIG. 2 may be the same as or substantially similar to the LiDAR system 300. As such, the discussion of LiDAR system 300 is sufficient for understanding LiDAR system 264 of FIG. 2.

As shown in FIG. 3, the LiDAR system 300 includes a housing 306 which may be rotatable 360° about a central axis such as hub or axle 316. The housing may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 211 as the housing 306 rotates around the internal components. In an alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The individual beams emitted by the light emitter system 304 will have a well-defined state of polarization that is not the same across the entire array. As an example, some beams may have vertical polarization and other beams may have horizontal polarization. The LiDAR system will also include a light detector 308 containing a photodetector or array of photodetectors positioned and configured to receive light reflected back into the system. The emitter system 304 and light detector 308 would rotate with the rotating shell, or they would rotate inside the stationary dome of the housing 306. One or more optical element structures 310 may be positioned in front of the light emitting unit 304 and/or the light detector 308 to serve as one or more lenses or waveplates that focus and direct light that is passed through the optical element structure 310.

One or more optical element structures 310 may be positioned in front of a mirror to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Optionally, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 318 to power the light emitting unit 304, a motor, and electronic components. The LiDAR system will also include an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
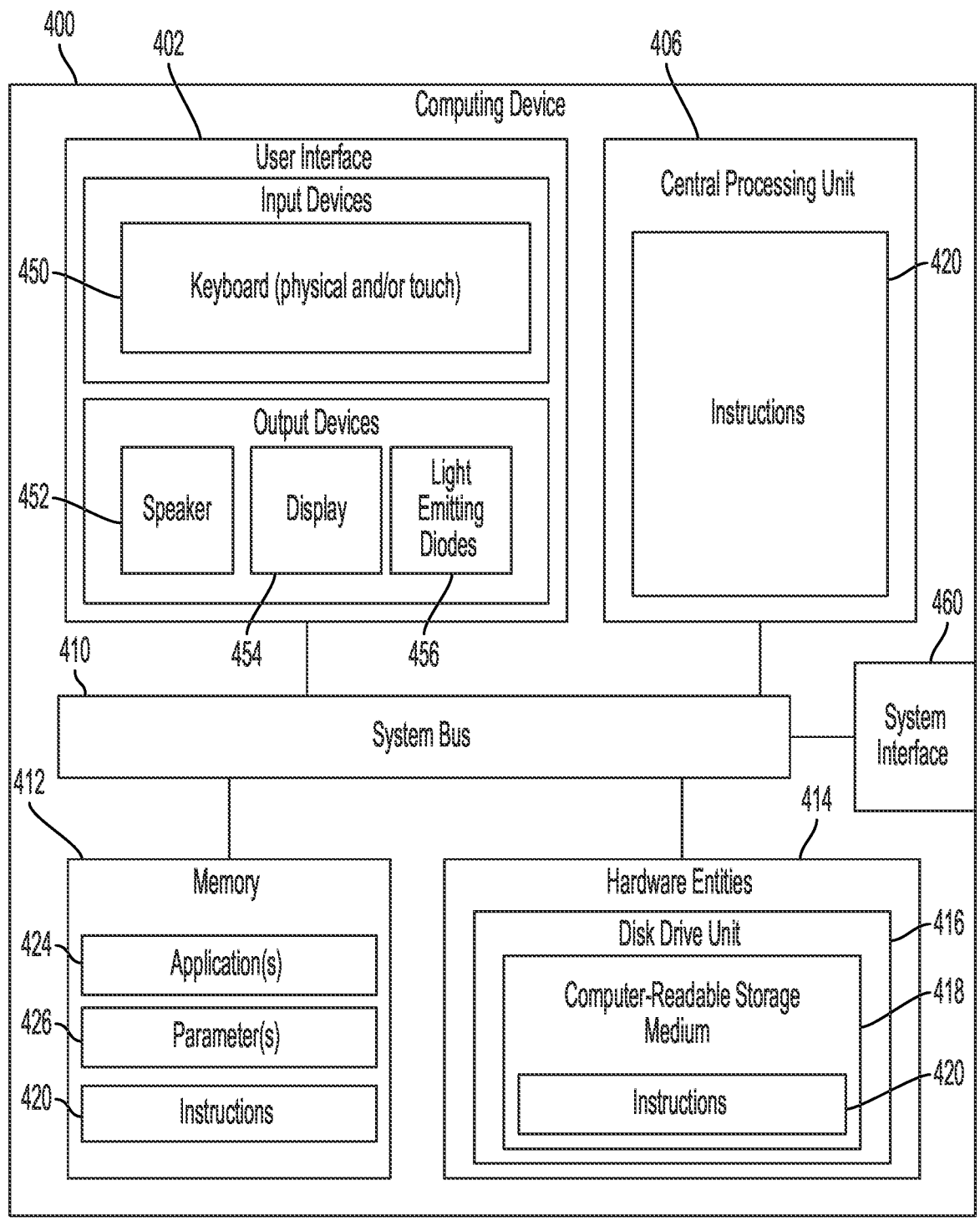
FIG. 4 is an illustration of an illustrative architecture for a computing device.

Referring now to FIG. 4, there is provided an illustration of an illustrative architecture for a computing device 400. The computing device 110 of FIG. 1 and/or the vehicle on-board computing device 220 of FIG. 2 is/are the same as or similar to computing device 400. As such, the discussion of computing device 400 is sufficient for understanding the computing device 110 of FIG. 1 and the vehicle on-board computing device 220 of FIG. 2.

Computing device 400 may include more or less components than those shown in FIG. 4. However, the components shown are sufficient to disclose an illustrative solution implementing the present solution. The hardware architecture of FIG. 4 represents one implementation of a representative computing device configured to operate a vehicle, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit (CPU) 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
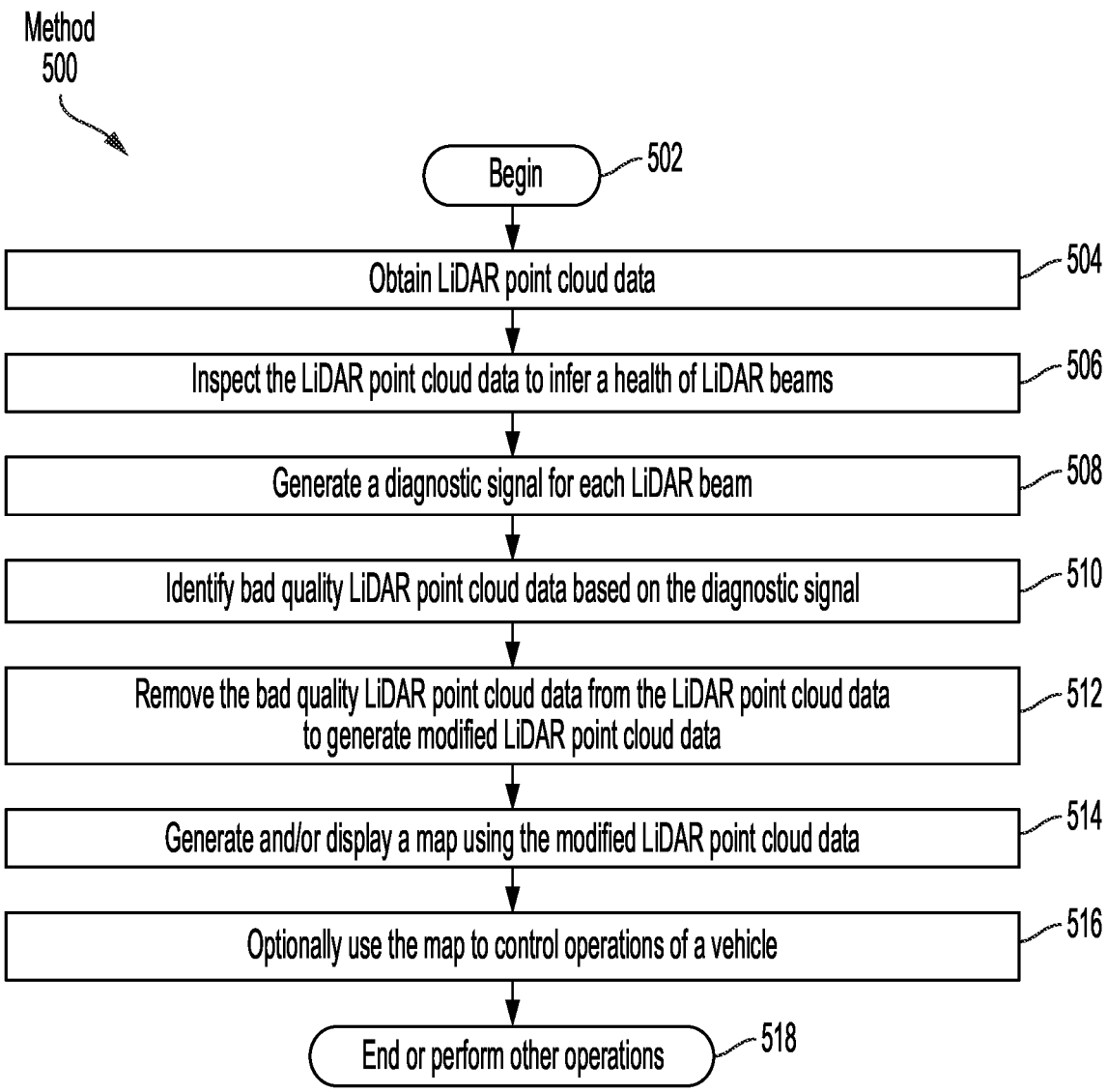
FIG. 5 provides a flow diagram of an illustrative method for generating high definition 3D maps for use in controlling operations of an autonomous vehicle.

Referring now to FIG. 5, there is provided a flow diagram of an illustrative method 500 for generating high definition 3D maps for use in controlling operations of an AV (e.g., AV $102_1$ of FIG. 1). Method 500 can be at least partially performed by the on-board computing device (e.g., the vehicle on-board computing device 220 of FIG. 2) of the AV or a computing device (e.g., computing device 110 of FIG. 1 and/or 400 of FIG. 4) remote from the AV.

As shown in FIG. 5, method 500 begins with 502 and continues with 504 where the computing device obtains LiDAR point cloud data generated by a LiDAR system (e.g., LiDAR system 264 of FIG. 2) of the AV. The LiDAR point cloud data includes a plurality of point clouds generated consecutively in time. Each point cloud represents a LiDAR system sweep, and thus includes all of the data points for all LiDAR beams in the given LiDAR system sweep. The LiDAR point cloud data also includes the following information for each data point in the point clouds: an x-coordinate, a y-coordinate, a z-coordinate, an intensity value (e.g., 0 to 255), and a laser number.

Next in 506, the LiDAR point cloud data is inspected to infer a health of the LiDAR beams. The health of a given LiDAR beam is inferred by: computing a plurality of metrics based on characteristics, features and/or attributes of LiDAR point cloud(s); determining a confidence score c based on the metrics; and classifying a LiDAR beam as a faulty beam or a good beam based on the confidence score c. For example, a LiDAR beam is classified as a faulty beam when the confidence score c is less than a threshold value thr. In contrast, the LiDAR beam is classified as a good beam when the confidence score c is equal to or greater than the threshold value thr. The type and number of metrics can be selected in accordance with a given application. The metrics can include, but are not limited, an outlier metric, a shape context metric, and a height metric. A faulty beam is detected based on at least one of the metrics and/or a threshold value. The threshold value can be a static predefined threshold value or an adjustable threshold value.

The characteristics, features and/or attributes of the LiDAR point cloud on which the metrics are based can include, but are not limited to, a point count, point spacing, point density, intensity values for the LiDAR point cloud, coordinate values for data points of the LiDAR point cloud, laser numbers, laser scan angles, ranges, and/or a range gradient in the azimuth angle per beam. The characteristics, features and/or attributes of the LiDAR point cloud are used to determine statistical facts about the LiDAR point cloud (s). The statistic facts can include, but are not limited to, an outlier fact (e.g., a Chauvenet statistical fact), a shape context fact, and/or a height fact (e.g., a histogram of height). The statistical facts can define the metrics.

In some scenarios, a combination of multiple approaches are used to infer the health of the LiDAR beams. The first approach uses the distribution of points from the point cloud. The distribution is extracted from the intensity value of each point, and a heuristic formula based on prior observations is used to infer a quality score of the LiDAR point cloud. The aggregated quality scores are utilized for one LiDAR health monitoring metric. The second approach uses Chauvenet's Criterion, which is a canonical way to assert whether a sample is an outlier from the samples. Chauvenet's Criterion is a technique to determine outliers, but in the context of LiDAR health monitoring, other known or to be known techniques can be used. The third approach uses a local distance filter to further find outliers from the point cloud.

Accordingly in these scenarios, the metric values are determined based on a total number of data points in a LiDAR point cloud, intensity values for the LiDAR point cloud, and/or z-coordinate values for data points of the LiDAR point cloud. For example, a first metric m1 is computed by: determining the total number of data points t in a given LiDAR point cloud; and setting a value of the first metric to the same (i.e., set m1=t).

Additionally or alternatively, a second metric m2 is computed by generating a histogram of intensity values for each LiDAR point cloud. The histogram is generated by: aggregating the intensity values for the data points in a given LiDAR point cloud; and determining the total number $n_n$ of data points for each intensity value (e.g., 10 data points have an intensity value of 1, while 5 data points have an intensity value of 55, etc.). The histogram is then defined as a set of total numbers (e.g., $n_0, \ldots, n_{255}$). The set of total numbers is converted to a single number N. This conversion can be achieved using a linear combination algorithm or a machine learn model. The single number N may be equal to a weighted sum of the numbers. For example, the single number N may be defined by the following mathematical equation (1).

$$N=(w1*n_0)+(w2*n_2)+(w3*n_3)+\ldots w255*n_{255})+w0 \qquad (1)$$

where w0, w1, w2, w3, . . . , w255 represent weights. A value of the second metric is then set equal to N (i.e., set m2=N).

Additionally or alternatively, a third metric m3 is computed. For each data point, the computing device uses a z-coordinate value $z_a$ to compute a distance d from a given data point to an average z-coordinate value $z_m$. The computing device then: determines a standard deviation SD of the z-coordinate values for the data points; computes a value $D_n$ by dividing the distance d by the standard deviation SD (i.e., m3=d/SD); and computes an average avg of all values $D_0, \ldots, D_{n-1}$ computed for the data points. A value of the third metric m3 is set equal to the average (i.e., m3=avg).

The confidence score c is determined based a weighted average of the first metric m1, second metric m2, and the third metric m3. The confidence score c is defined by mathematical equation (2).

$$c=(w1*m1)+(w2*m2)+(w3*m3)+w0 \qquad (2)$$

The LiDAR beam is classified as (i) a faulty beam when the confidence score c is less than a threshold value thr or (ii) as a good beam when the confidence score c is equal to or greater than the threshold value thr. The present solution is not limited to the particulars of these scenarios.

Upon completing 506, method 500 continues with 508 where a diagnostic signal is generated for each LiDAR beam. Each diagnostic signal indicates whether a respective LiDAR beam was classified as a good beam or a faulty beam in 506. For example, the diagnostic signal comprises a digital signal with a value of zero to indicate that the respective LiDAR beam was classified as a good beam, or a value of one to indicate that the respective LiDAR beam was classified as a faulty beam. The present solution is not limited to the particulars of this example.

Next in 510, bad quality LiDAR point cloud data is identified based on the diagnostic signals. The bad quality LiDAR point cloud data is the data generated by LiDAR beams that are associated with diagnostic signals having values indicating that they were classified as faulty beams. The bad quality LiDAR point cloud data is removed from the LiDAR point cloud data obtained in 504 to generate modified LiDAR point cloud data. The modified LiDAR point cloud data may be used in 514 to generate a map online and/or offline (e.g., by aggregating a plurality of LiDAR point clouds). The map may be displayed on a display screen (e.g., display 454 of FIG. 4) of the computing device. An illustrative method for generating the map will become evident as the discussion progresses. The map may be used in 516 to control autonomous driving operations of the AV. The autonomous driving operations can include, but are not limited to, object tracking operations, object trajectory prediction operations, vehicle trajectory determination operations, and/or collision avoidance operations. For example, the map is used to facilitate generation of a predicted object trajectory, a predicted future intention of the object, and/or a vehicle trajectory. The vehicle may then be controlled to follow the vehicle trajectory if there is an acceptable level of risk for collision with the object or perform a cautious or emergency maneuver if there is an unacceptable level of risk for collision with the object. The present solution is not limited to the particulars of this example. Additionally or alternatively, 516 can include causing an operational mode of the AV to be changed (e.g., from an autonomous mode to an at least partially manual operational mode requiring input from a user via user-software interactions directly with the AV and/or via teleoperation control signals). Subsequently, 518 is performed where method 500 ends or other operations are performed (e.g., return to 504).

Referring now to FIG. 6, there is provided a flow diagram of an illustrative method 600 for map generation. Method 600 can be performed in 514 of FIG. 5 to generate the map using the modified LiDAR point cloud data.

Figure 6A:
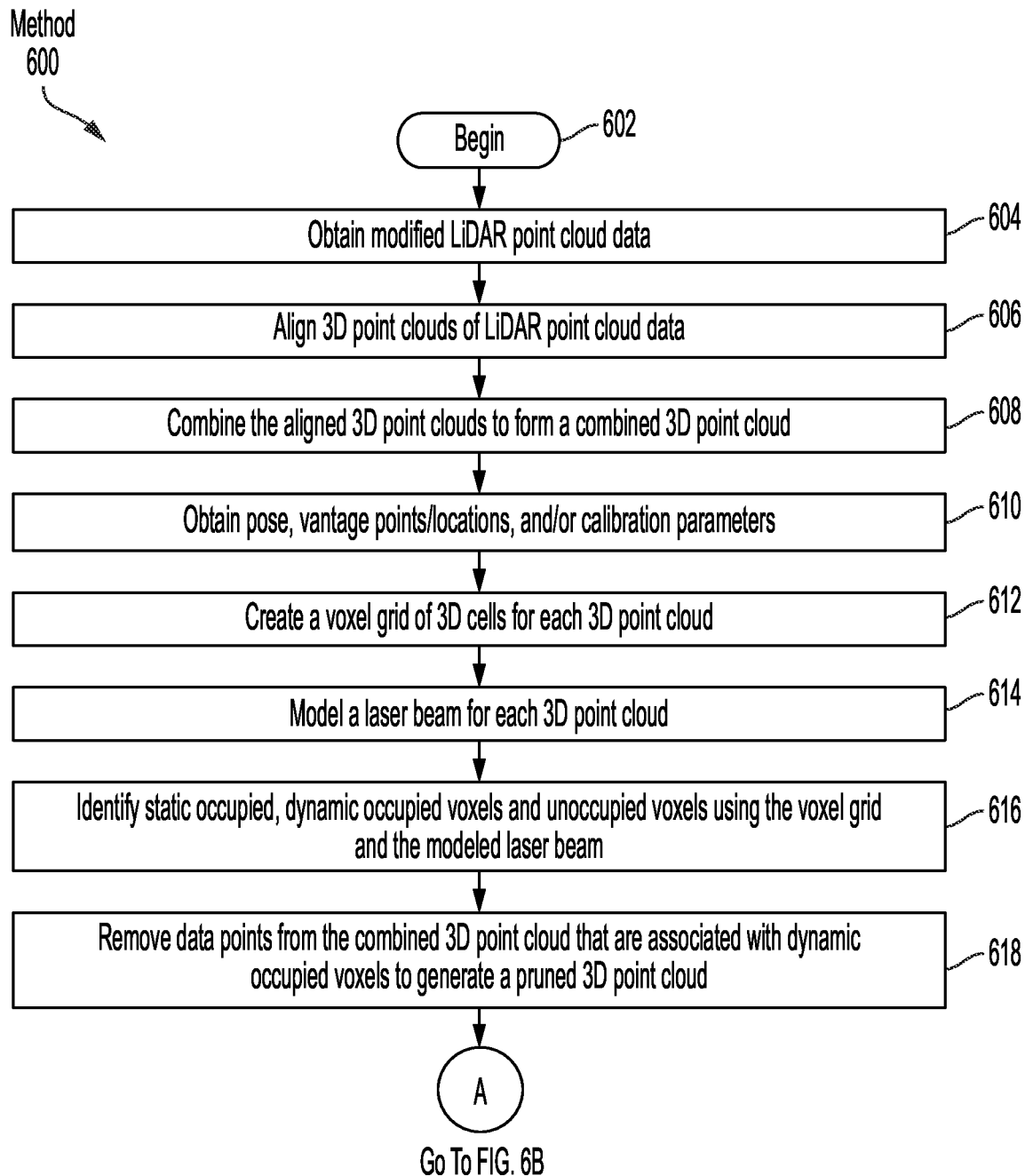
FIGS. 6A-6B (collectively referred to as "FIG. 6") provide a flow diagram of an illustrative method for map generation.
Figure 7:
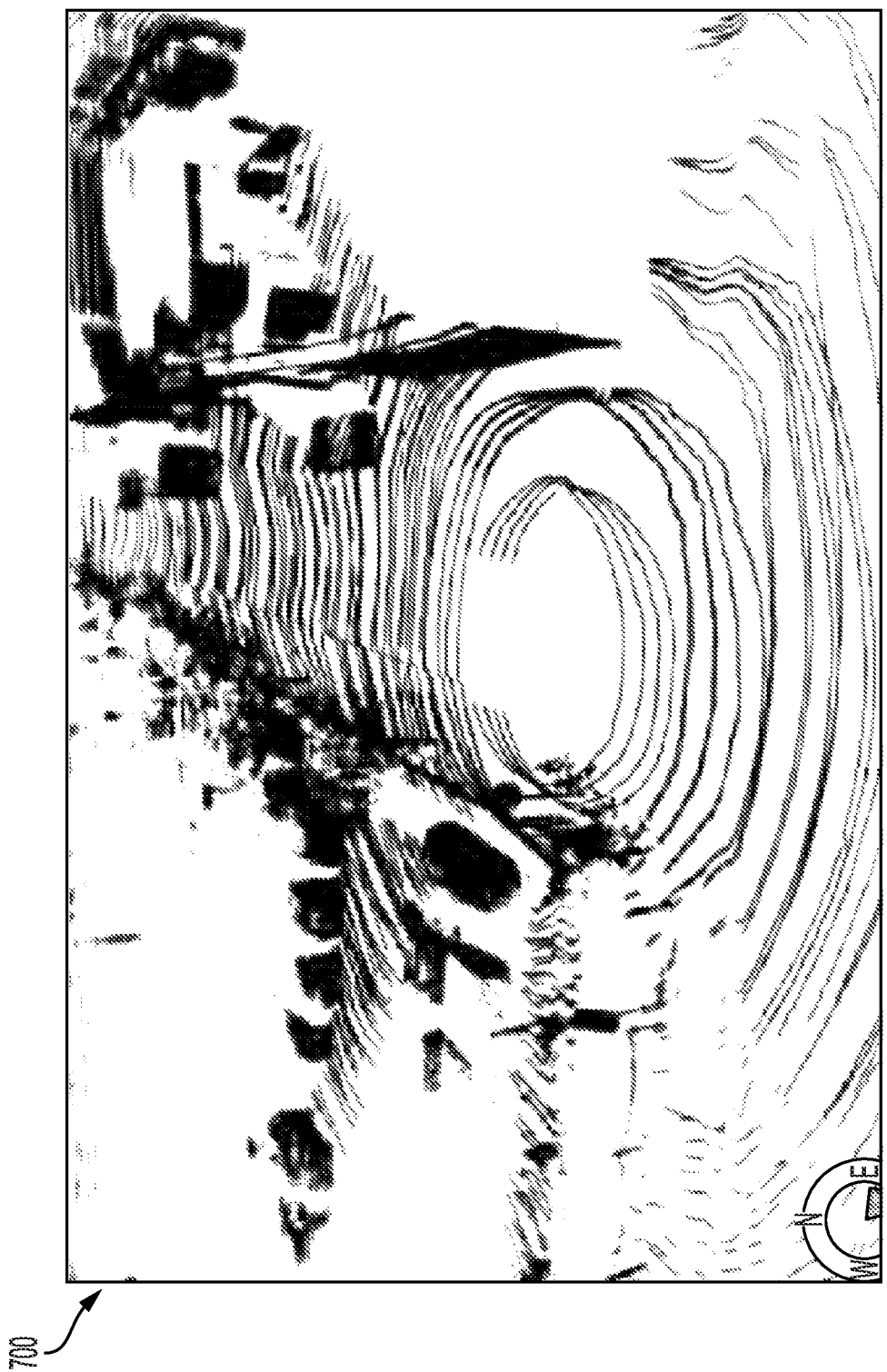
FIG. 7 provides an illustration of an illustrative combined 3D point cloud.

As shown in FIG. 6A, method 600 begins with 602 and continues with 604 where the modified LiDAR point cloud data is obtained by a computing device (e.g., computing device 100 of FIG. 1, 200 of FIG. 2, and/or 400 of FIG. 4). The modified LiDAR point cloud data can be obtained from a datastore (e.g., datastore 112 of FIG. 1 and/or memory 412 of FIG. 4). The modified LiDAR point cloud data can include 3D range data that was generated by a LiDAR system (e.g., LiDAR system 264 of FIG. 2 and/or 300 of FIG. 3) from multiple vantage points or locations. A 3D point cloud is provided for each vantage point or location. The 3D point clouds are aligned with each other by the computing device in 606. This point cloud alignment can be achieved using any known or to be known technique. For example, the 3D point clouds are aligned using Simultaneous Localization and Mapping (SLAM) which is a well-known data point alignment technique. In 608, the aligned 3D point clouds are combined by the computing device to form a combined 3D point cloud. An illustration of an illustrative combined 3D point cloud 700 is provided in FIG. 7.

In 610, the computing device obtains information specifying a known pose, known vantage points/locations of the LiDAR system, and known LiDAR system calibration parameters. The pose includes a location defined as 3D map coordinates, an angle and a pointing direction of a vehicle or other structure to which the LiDAR system is disposed. The information can be obtained from a datastore (e.g., datastore 112 of FIG. 1 and/or memory 412 of FIG. 4).

Next, ray-tracing operations are performed by the computing device to test whether any object of the modified LiDAR point cloud data was at any time see-through. Stationary objects (e.g., buildings) will not be see-through at any time, but data points on moving object will be see-through at given times. Ray-tracing techniques are well known in the art. Any known or to be known ray-tracing technique can be used here. In some scenarios, the ray-tracing operations of 612-616 are performed. In 612, the computing device creates a voxel grid of 3D cells (called "voxels") for each 3D point cloud. Voxel grids are well known. A single data point of a 3D point cloud is contained in a given 3D cell. A voxel that includes a data point is called an occupied voxel, while a voxel that is absent of any data point is called an unoccupied voxel.

Figure 8:
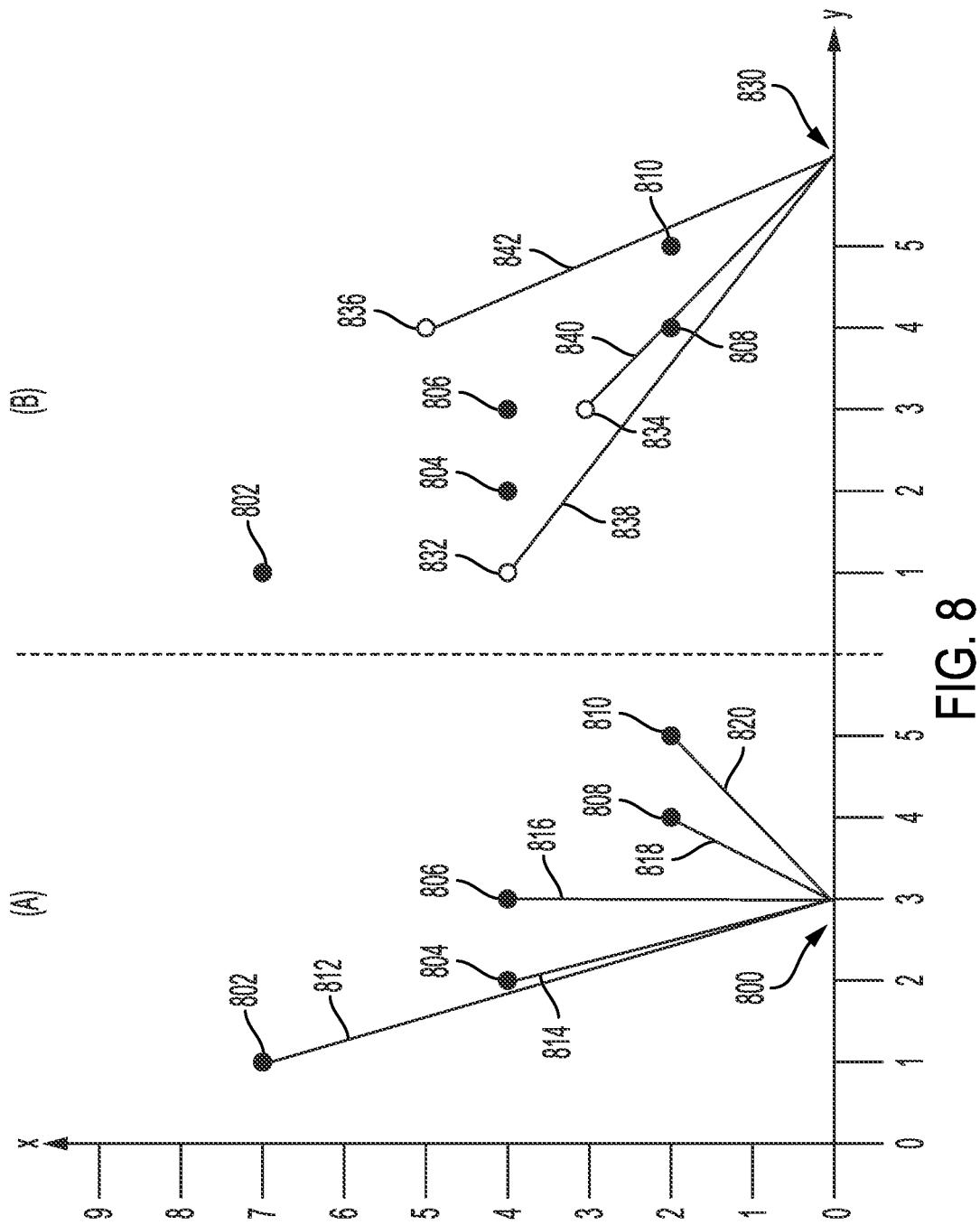
FIG. 8 provides graph(s) that are useful for understanding ray-casting.

614 involves modeling a laser beam for each 3D point cloud using the information obtained in 610 (i.e., the known pose, known vantage points/locations of the LiDAR system, and known LiDAR system calibration parameters). The laser beam is modeled for each 3D point cloud by defining a line of sight from a known location of the LiDAR system to each data point therein. An illustration is provided in FIG. 8 showing illustrative lines of sights 812, 814, 816, 818, 820, 838, 840, 842. Only the x-axis and y-axis is shown in FIG. 8. The z-axis is not shown in FIG. 8 for simplicity of discussion.

In portion (A) of FIG. 8, a plurality of data points 802, 804, 806, 808, 810 are shown. Arrow 800 of FIG. 8(A) points to a location on the graph representing a first vantage point/location of the 3D laser scanner when the data points 802, 804, 806, 808, 810 were generated. Line of sight 812 extends from the first vantage point/location 800 of the 3D laser scanner to data point 802. Line of sight 814 extends from the first vantage point/location 800 of the 3D laser scanner to data point 804. Line of sight 816 extends from the first vantage point/location 800 of the 3D laser scanner to data point 806. Line of sight 818 extends from the first vantage point/location 800 of the 3D laser scanner to data point 808. Line of sight 820 extends from the first vantage point/location of the 3D laser scanner to data point 810.

In portion (B) of FIG. 8, a plurality of data points 832, 834, 836 are shown. Arrow 830 of FIG. 8(B) points to a location on the graph representing a second vantage point/location of the 3D laser scanner when the data points 832, 834, 836 were generated. Line of sight 838 extends from the second vantage point/location of the 3D laser scanner to data point 802. Line of sight 814 extends from the first vantage point/location 830 of the 3D laser scanner to data point 832. Line of sight 840 extends from the first vantage point/location 830 of the 3D laser scanner to data point 834. Line of sight 842 extends from the first vantage point/location 830 of the 3D laser scanner to data point 836. The present solution is not limited to the particulars of FIG. 8.

In 616, the computing device performs operations to identify static occupied voxels, dynamic occupied voxels and unoccupied voxels using the voxel grid created in 612 and the modeled laser beam created in 614. An unoccupied voxel comprises a voxel which is absent of any data point. A static occupied voxel comprises a data point through which a line of sight of a single 3D point cloud passes. For example, in FIG. 8, static occupied voxels include voxels containing data points 802, 804, 806, 810, 832, 834, 836. These data points may be, for example, associated with building(s), tree(s), and/or sign(s). Dynamic occupied voxels comprises voxels containing data points through which lines of sight of at least two 3D point clouds pass. For example, in FIG. 8, a dynamic occupied voxel comprises a voxel containing data point 808 since line of sight 818 of portion (A) and line of sight 840 of portion (B) both intersect the same. Data point 808 may be, for example, associated with a moving vehicle (e.g., vehicle $102_2$ of FIG. 1), a pedestrian (e.g., pedestrian 116 of FIG. 1), or a cyclist (e.g., cyclist 114 of FIG. 1). Static occupied voxels and dynamic occupied voxels are identified by traversing the lines of sights 812-820, 838-842 through the voxel grid. The present solution is not limited to the particulars of these examples.

Figure 9:
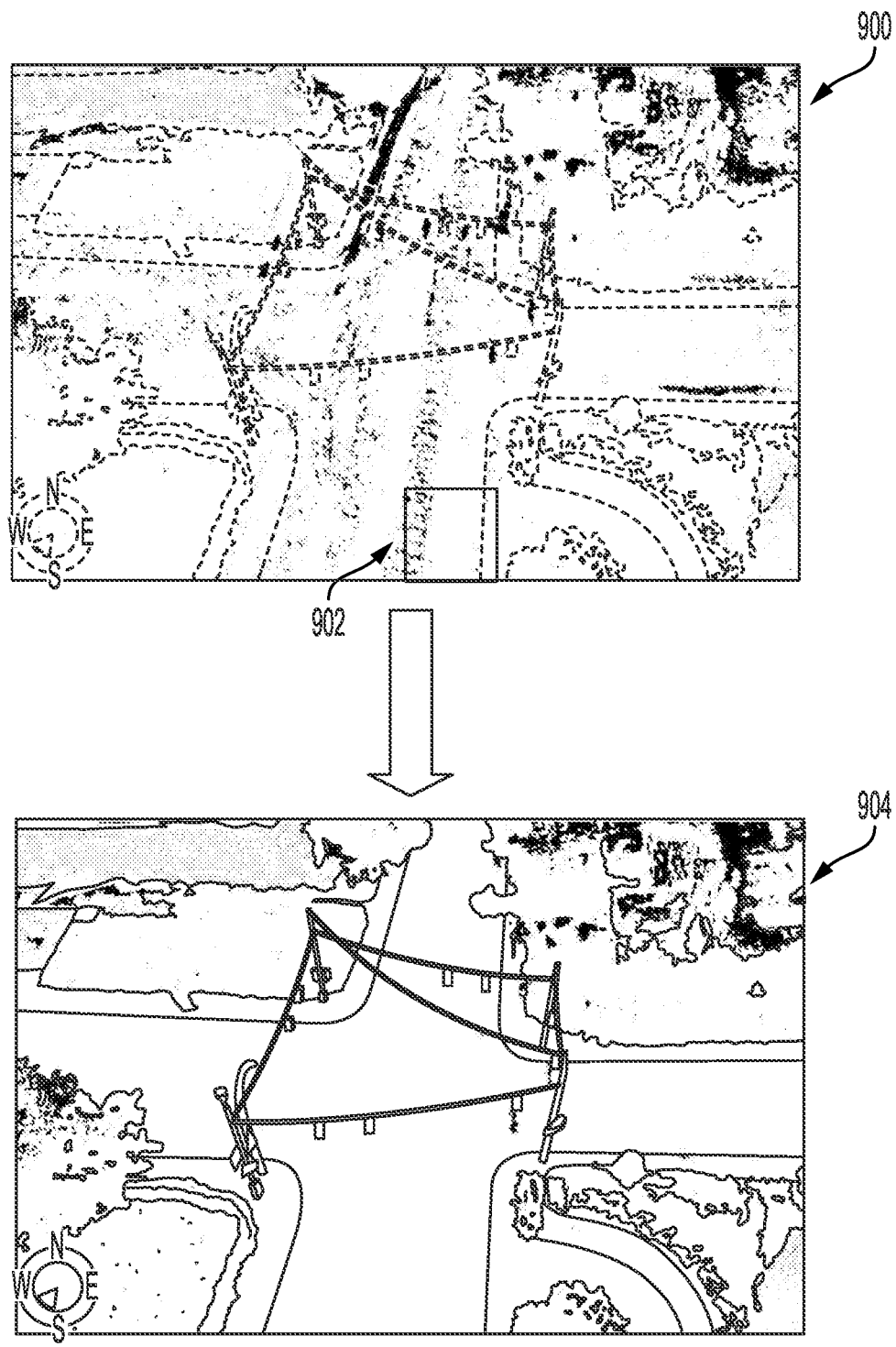
FIG. 9 provides images of point clouds.

Referring again to FIG. 6A, method 600 continues with 618 where the computing device performs operations to remove data points from the combined 3D point cloud that are associated with the dynamic occupied voxels to generate a pruned 3D point cloud. An illustrative pruned 3D point cloud 900 is shown in FIG. 9. Subsequently, method 600 continues with semantic label class operations of FIG. 6B to further remove data points from the pruned 3D point cloud that are associated with moving objects.

Figure 6B:
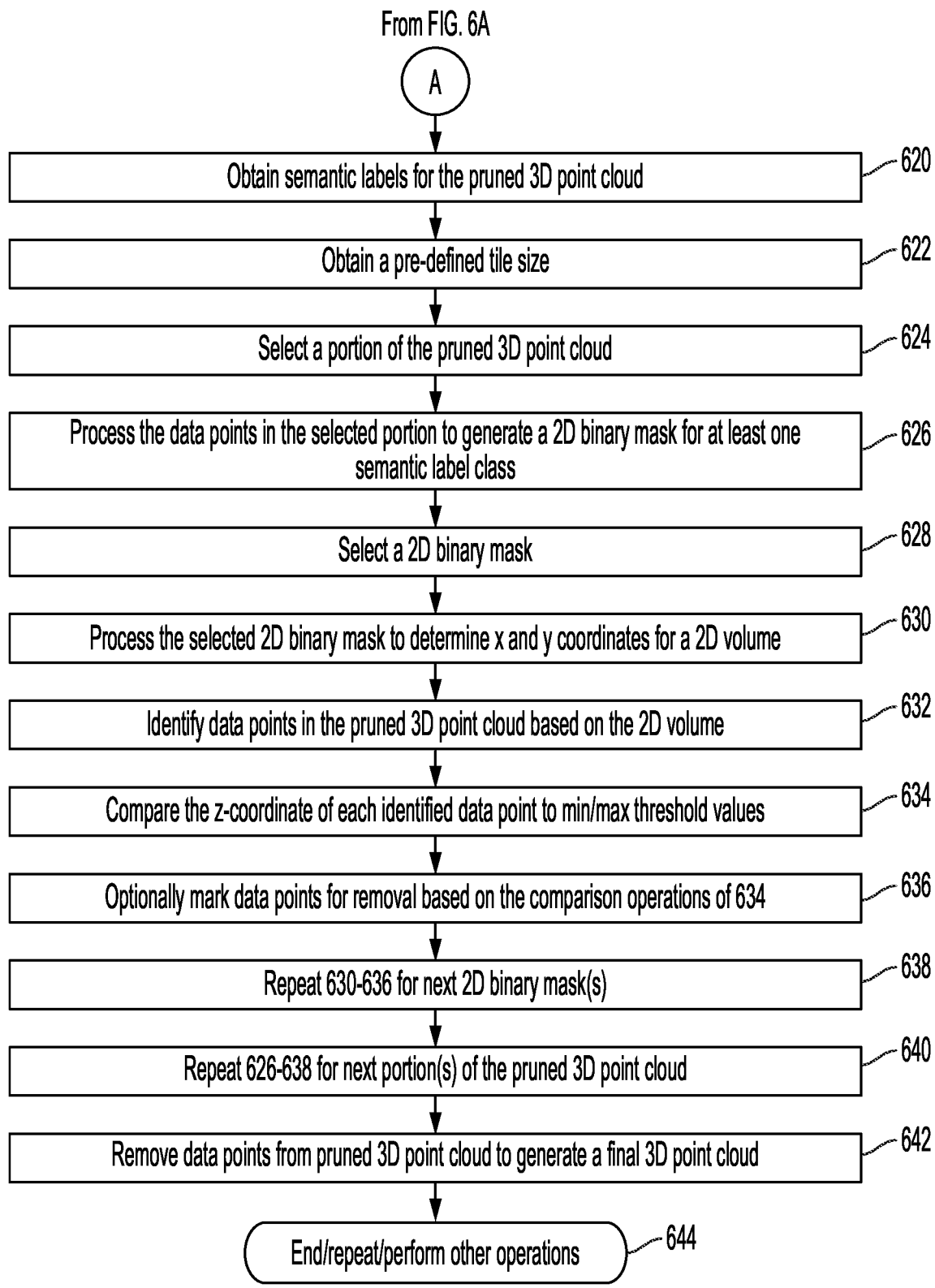

As shown in FIG. 6B, 620 involves obtaining by the computing device semantic labels for the pruned 3D point cloud from a datastore (e.g., datastore 112 of FIG. 1 and/or memory 412 of FIG. 4). Semantic labels for data points are well known. The semantic labels can include, but are not limited to, no data, unlabeled, road, sidewalk, building, fence, vegetation, terrain, vehicle, person, animal, and/or sign. Each data point of the pruned 3D point cloud has a semantic label associated therewith. The semantic labels are then used in operations 622-640 along with the pruned 3D point cloud to test whether any remaining data points of given semantic label classes (e.g., road and/or sidewalk) reside above the given surface by certain distances.

Operations 622-626 involve: obtaining from the datastore a pre-defined tile size (e.g., 30 meter by 30 meter); selecting a portion of the pruned 3D point cloud having the pre-defined tile size (e.g., portion 902 of FIG. 9); and processing the data points in the selected portion of the pruned 3D point cloud to generate a 2D binary mask for each semantic label class of interest (e.g., road and sidewalk).

Figure 11:
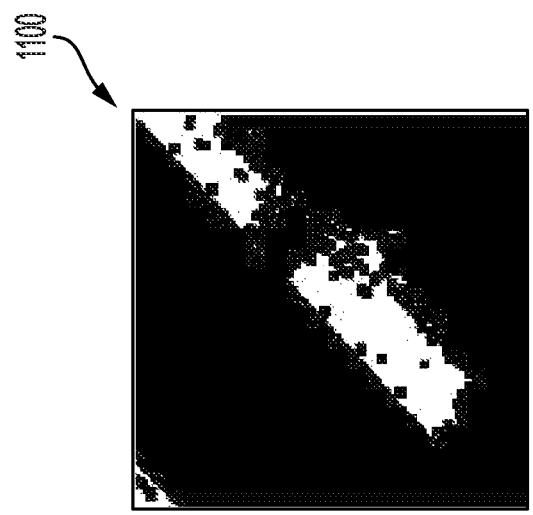
FIG. 11 shows an illustrative 2D binary mask for a sidewalk semantic label class.
Figure 10:
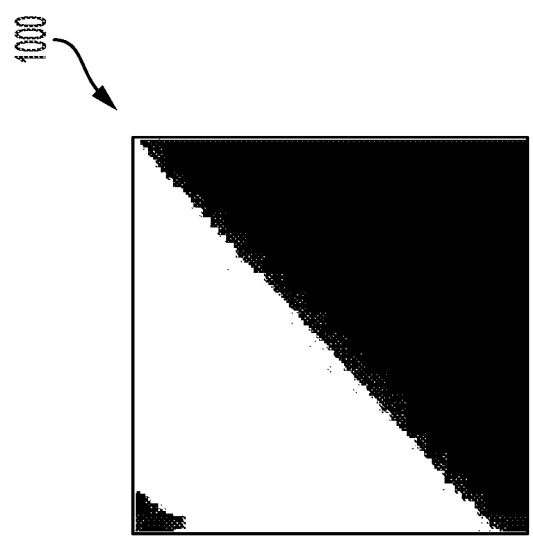
FIG. 10 shows an illustrative 2D binary mask for a road semantic label class.

In some scenarios, a 2D binary mask is created for a road semantic label class and a sidewalk semantic label class. An illustrative 2D binary mask 1000 for the road semantic label class is provided in FIG. 10. The 2D binary mask 1000 is created by projecting the 3D data points of the selected portion of the pruned 3D point cloud to a 2D plane. The data points associated with a road are shown in a first color (e.g., white), while all other data points are shown in a second different color (e.g., black). An illustrative 2D binary mask 1100 for the sidewalk semantic label class is provided in FIG. 11. The 2D binary mask 1100 is created by projecting the 3D data points of the selected portion of the pruned 3D point cloud to a 2D plane. The data points associated with a sidewalk are shown in a first color (e.g., white), while all other data points are shown in a second different color (e.g., black). The present solution is not limited to the particulars of FIGS. 10-11.

Referring again to FIG. 6B, method 600 continues with 628 where the computing device selects one of the 2D binary masks for subsequent processing. The computing device then processes the selected 2D binary mask in 630 to determine x-coordinates and y-coordinates for a 2D volume that defines the object of the given semantic label class (e.g., a road or a sidewalk). Next in 632, the computing device identifies data points in the pruned 3D point cloud that (i) are of the same semantic label class (e.g., road or sidewalk) as the object defined by the 2D volume and (ii) have x-coordinates/y-coordinates contained in the 2D volume.

The z-coordinate of each identified data point is compared in 634 to a minimum threshold value and to a maximum threshold value. The threshold values are pre-defined for the respective semantic label class (e.g., road or sidewalk) of a plurality of semantic label classes. The semantic label classes can have the same or different threshold value(s) associated therewith. Data points are optionally marked for removal in 636 based on results of the comparison operations. For example, data points are marked for removal which have z-coordinates that are greater than the minimum threshold value (0.3 meters) and less than the maximum threshold value (4.5 meters for road surfaces and 2.5 meters for sidewalk surfaces).

Operations of 630-636 are repeated for next 2D binary mask(s), as shown by 638. Also, operations 626-638 are repeated for next portions(s) of the pruned 3D point cloud, as shown by 640. In 642, data points are removed from the pruned 3D point cloud to generate a final 3D point cloud. An illustration of a final 3D point cloud 904 is shown in FIG. 9. The 3D point cloud 904 is absent of or has a reduced number of data points associated with moving objects. Notably, data points for stationary structures (e.g., trees and fixtures) residing above the roads and/or sidewalks have been preserved in the final 3D point cloud 904. The final 3D point cloud defines a high definition map. Subsequently, 644 is performed where method 600 ends or other processing is performed (e.g., return to 602 of FIG. 5A).

Figure 12:
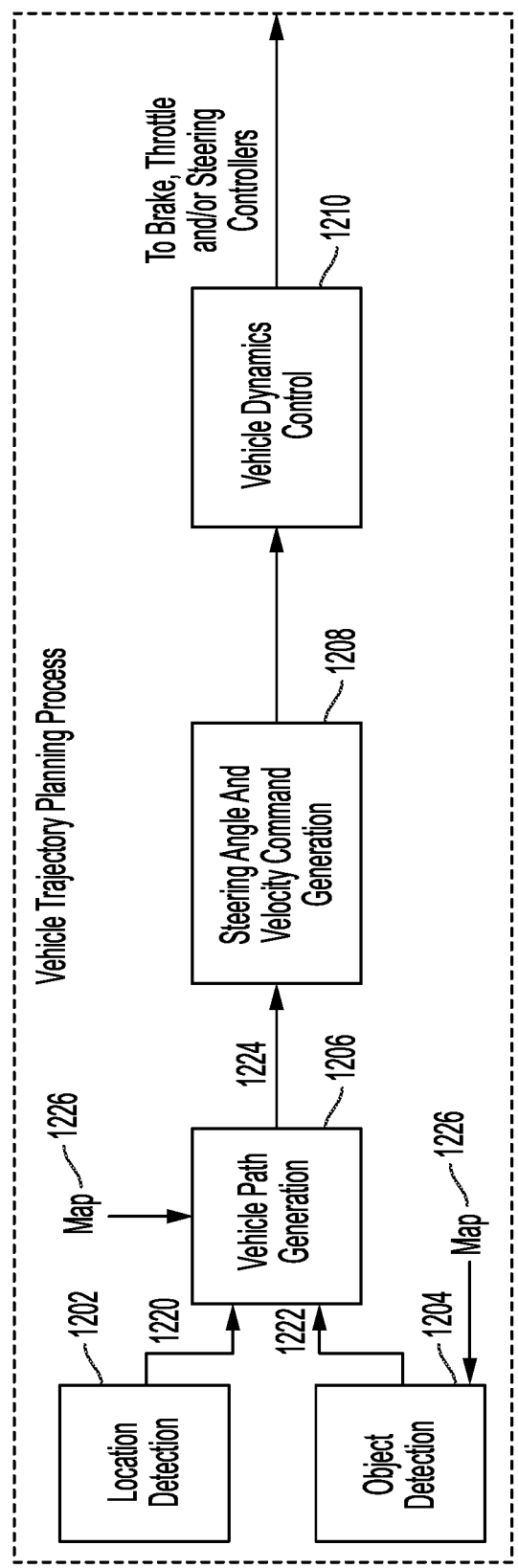
FIG. 12 provides a block diagram that is useful for understanding how vehicle control is achieved in accordance with the present solution.

As noted above, the high definition map can be used by an AV for object trajectory prediction, vehicle trajectory generation, and/or collision avoidance. A block diagram is provided in FIG. 12 that is useful for understanding how vehicle control is achieved in accordance with the present solution. All or some of the operations performed in FIG. 12 can be performed by the on-board computing device of a vehicle (e.g., AV $102_1$ of FIG. 1) and/or a remote computing device (e.g., computing device 110 of FIG. 1).

In block 1202, a location of the vehicle is detected. This detection can be made based on sensor data output from a location sensor (e.g., location sensor 260 of FIG. 2) of the vehicle. This sensor data can include, but is not limited to, GPS data. Information 1220 specifying the detected location of the vehicle is then passed to block 1206.

In block 1204, an object is detected within proximity of the vehicle. This detection is made based on sensor data output from a camera (e.g., camera 262 of FIG. 2) of the vehicle. Any known or to be known object detection technique can be used here. Information about the detected object 1222 is passed to block 1206. This information includes, but is not limited to a position of an object, an orientation of the object, a spatial extent of the object, an initial predicted trajectory of the object, a speed of the object, and/or a classification of the object. The initial predicted object trajectory can include, but is not limited to, a linear path pointing in the heading direction of the object. The initial predicted trajectory of the object can be generated using a high definition map 1226 (or final 3D point cloud) which was generated in accordance with the above-described methods 500 and 600.

In block 1206, a vehicle trajectory is generated using the information from blocks 1202 and 1204, as well as the high definition map 1226. Techniques for determining a vehicle trajectory are well known in the art. Any known or to be known technique for determining a vehicle trajectory can be used herein. For example, in some scenarios, such a technique involves determining a trajectory for the AV that would pass the object when the object is in front of the AV, the object has a heading direction that is aligned with the direction in which the AV is moving, and the object has a length that is greater than a threshold value. The present solution is not limited to the particulars of this scenario. The vehicle trajectory 1224 can be determined based on the location information 1220, the object detection information 1222, and/or a high definition map 1226 which is stored in a datastore of the vehicle. The vehicle trajectory 1224 may represent a smooth path that does not have abrupt changes that would otherwise provide passenger discomfort. For example, the vehicle trajectory is defined by a path of travel along a given lane of a road in which the object is not predicted travel within a given amount of time. The vehicle trajectory 1224 is then provided to block 1208. Other information may additionally be provided to block 1208. This other information may include, but is not limited to, a level of risk for a collision between the vehicle and the object, an indication as to whether the level of risk is acceptable or unacceptable, cautious maneuver identifier/particulars, and/or emergency maneuver identifier/particulars.

In block 1208, a steering angle and velocity command is generated based on the vehicle trajectory 1224. The steering angle and velocity command is provided to block 1210 for vehicle dynamics control. Vehicle dynamics control is well known. The vehicle dynamics control cause the vehicle to follow the vehicle trajectory 1224 (e.g., if there is an acceptable level of risk for collision with the object) or perform a cautious or emergency maneuver (e.g., if there is an unacceptable level of risk for collision with the object). The present solution is not limited to the particulars of this example.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating an autonomous vehicle, comprising:
    obtaining, by a computing device, LiDAR point cloud data generated by a LiDAR system of the autonomous vehicle;
    inspecting, by the computing device, the LiDAR point cloud data to infer a health of LiDAR beams;
    identifying, by the computing device, bad quality point cloud data based on the inferred health of the LiDAR beams;
    removing, by the computing device, the bad quality point cloud data from the LiDAR point cloud data to generate modified LiDAR point cloud data; and
    causing, by the computing device, the autonomous vehicle to perform at least one autonomous driving operation or mode change based on the modified LiDAR point cloud data;

wherein the health of the LiDAR beam is inferred by computing a plurality of metrics based on characteristics of a LiDAR point cloud defined by the LiDAR point cloud data; and wherein a metric of the plurality of metrics is generated by:
determining a first number representing a total number of data points in the LIDAR point cloud that have a first intensity value of a plurality of intensity values, and a second number representing a total number of data points in the LIDAR point cloud that have a different second intensity value of the plurality of intensity values;
combining the first number and the second number to obtain a third number; and
setting a value of the metric equal to the third number.

2. The method according to claim 1, wherein the health of the LiDAR beam is inferred by further computing a confidence score based on the plurality of metrics.

3. The method according to claim 2, wherein the health of the LiDAR beam is inferred by further classifying the LiDAR beam as a faulty beam or a good beam based on the confidence score.

4. The method according to claim 3, wherein the LiDAR beam is classified as a faulty beam when the confidence score is less than a threshold value.

5. The method according to claim 1, wherein the plurality of metrics comprise at least one of a shape context metric, and a height metric.

6. The method according to claim 1, wherein the plurality of metrics are determined based on at least one of a total number of data points in the LiDAR point cloud, intensity values of the LiDAR point cloud, and z-coordinate values for data points in the LiDAR point cloud.

7. The method according to claim 1, wherein another metric of the plurality of metrics is equal to a total number of data points in the LiDAR point cloud.

8. The method according to claim 1, wherein another metric of the plurality of metrics is generated by:
using a z-coordinate value to compute a distance from each given data point to an average z-coordinate value;
determining a standard deviation of the z-coordinate values for data points in a LiDAR point cloud;
dividing each distance by the standard deviation to obtain a value;
computing an average of the values.

9. A system, comprising:
a processor;
a non-transitory computer-readable storage medium comprising programming instructions that are configured to cause the processor to implement a method for operating an autonomous vehicle, wherein the programming instructions comprise instructions to:
obtain LiDAR point cloud data generated by a LiDAR system of the autonomous vehicle;
inspect the LiDAR point cloud data to infer a health of LiDAR beams;
identify bad quality point cloud data based on the inferred health of the LiDAR beams;
remove the bad quality point cloud data from the LiDAR point cloud data to generate modified LiDAR point cloud data; and
cause the autonomous vehicle to perform at least one autonomous driving operation or mode change based on the modified LiDAR point cloud data;
wherein the health of the LiDAR beam is inferred by computing a plurality of metrics based on characteristics of a LiDAR point cloud defined by the LiDAR point cloud data; and
wherein a metric of the plurality of metrics is generated by:
determining a first number representing a total number of data points in the LIDAR point cloud that have a first intensity value of a plurality of intensity values, and a second number representing a total number of data points in the LIDAR point cloud that have a different second intensity value of the plurality of intensity values;
combining the first number and the second number to obtain a third number; and
setting a value of the metric equal to the third number.

10. The system according to claim 9, wherein the health of the LiDAR beam is inferred by further computing a confidence score based on the plurality of metrics.

11. The system according to claim 10, wherein the health of the LiDAR beam is inferred by further classifying the LiDAR beam as a faulty beam or a good beam based on the confidence score.

12. The system according to claim 11, wherein the LiDAR beam is classified as a faulty beam when the confidence score is less than a threshold value.

13. The system according to claim 9, wherein the plurality of metrics comprise at least one of an outlier metric, a shape context metric, and a height metric.

14. The system according to claim 9, wherein the plurality of metrics are determined based on at least one of a total number of data points in the LiDAR point cloud, intensity values of the LiDAR point cloud, and z-coordinate values for data points in the LiDAR point cloud.

15. The system according to claim 9, wherein another metric of the plurality of metrics is equal to a total number of data points in the LiDAR point cloud.

16. The system according to claim 9, wherein another metric of the plurality of metrics is generated by:
using a z-coordinate value to compute a distance from each given data point to an average z-coordinate value;
determining a standard deviation of the z-coordinate values for data points in a LiDAR point cloud;
dividing each distance by the standard deviation to obtain a value;
computing an average of the values.

* * * * *